(12) United States Patent
Singh et al.

(10) Patent No.: US 9,737,860 B2
(45) Date of Patent: Aug. 22, 2017

(54) HOLLOW FIBER MEMBRANE HAVING HEXAGONAL VOIDS

(71) Applicant: PALL CORPORATION, Port Washington, NY (US)

(72) Inventors: Amarnauth Singh, Selden, NY (US); Yolando David, Glen Cove, NY (US); Shane Edward Harton, Port Washington, NY (US)

(73) Assignee: Pall Corporation, Port Washington, NY (US)

( * ) Notice: Subject to any disclaimer, the term of this patent is extended or adjusted under 35 U.S.C. 154(b) by 66 days.

(21) Appl. No.: 14/193,825

(22) Filed: Feb. 28, 2014

(65) Prior Publication Data

US 2015/0246325 A1 Sep. 3, 2015

(51) Int. Cl.
*B01D 69/08* (2006.01)
*B01D 69/02* (2006.01)
*B01D 67/00* (2006.01)

(52) U.S. Cl.
CPC ........... *B01D 69/08* (2013.01); *B01D 67/003* (2013.01); *B01D 69/02* (2013.01); *B01D 69/087* (2013.01);
(Continued)

(58) Field of Classification Search
None
See application file for complete search history.

(56) References Cited

U.S. PATENT DOCUMENTS 2,913,419 A 11/1959 Alexander
2,974,108 A 3/1961 Alexander
(Continued)

FOREIGN PATENT DOCUMENTS

CA 1047719 A2 2/1979
CA 2509628 C 11/2007
(Continued)

OTHER PUBLICATIONS

Cai et al., "An improved convective self-assembly method for the fabrication of binary colloidal crystals and inverse structures," *Journal of Colloid and Interface Science*, 380, 42-50 (2012).
(Continued)

*Primary Examiner* — Krishnan S Menon
(74) *Attorney, Agent, or Firm* — Leydig, Voit & Mayer, Ltd.

(57) ABSTRACT

Disclosed is a hollow fiber membrane having hexagonal voids, suitable for use in high throughput filtration applications. Thus, the membrane includes (i) an inner surface; (ii) an outer surface; and (iii) a porous bulk disposed therebetween, wherein the porous bulk comprises at least a first region including: a) a first set of pores having a first controlled pore size and having outer rims; b) a second set of pores connecting the outer rims of the first set of pores, wherein the pore size of the first set of pores is greater than the pore size of the second set of pores; and c) a polymer matrix supporting the first set of pores. Also disclosed is a method for preparing such hollow fiber membranes, which involves coating a filament with a coating composition that includes a membrane-forming polymer and dissolvable nanoparticles, followed by phase invention, and dissolving of the nanoparticles. The filament is removed to obtain the hollow fiber membrane.

6 Claims, 5 Drawing Sheets

(52) U.S. Cl.
CPC ...... *B01D 2323/18* (2013.01); *B01D 2323/24* (2013.01); *B01D 2325/021* (2013.01)

(56) References Cited

U.S. PATENT DOCUMENTS

| | | | |
|---|---|---|---|
| 3,957,651 A | 5/1976 | Kesting | |
| 4,177,228 A * | 12/1979 | Prolss | C08J 9/26 210/500.21 |
| 4,188,418 A | 2/1980 | Livingston | |
| 4,289,600 A | 9/1981 | Lazarz et al. | |
| 4,289,681 A | 9/1981 | Nauroth et al. | |
| 4,764,497 A | 8/1988 | Yuasa et al. | |
| 4,940,571 A | 7/1990 | Su et al. | |
| 5,024,826 A | 6/1991 | Linton | |
| 5,100,581 A | 3/1992 | Watanabe et al. | |
| 5,102,917 A | 4/1992 | Bedwell et al. | |
| 5,221,497 A | 6/1993 | Watanabe et al. | |
| 5,453,260 A | 9/1995 | Nakazawa et al. | |
| 6,083,393 A | 7/2000 | Konstantin et al. | |
| 6,255,359 B1 * | 7/2001 | Agrawal | A61L 27/18 521/61 |
| 6,372,806 B1 | 4/2002 | Keiser et al. | |
| 6,548,264 B1 | 4/2003 | Tan et al. | |
| 6,680,013 B1 | 1/2004 | Stein et al. | |
| 6,770,130 B2 | 8/2004 | Kato et al. | |
| 6,800,267 B2 | 10/2004 | Schubert et al. | |
| 6,855,427 B2 | 2/2005 | Kunkeler et al. | |
| 6,890,436 B2 | 5/2005 | Komatsu et al. | |
| 6,906,109 B2 | 6/2005 | Paszkowski | |
| 6,929,764 B2 | 8/2005 | Jiang et al. | |
| 7,438,875 B2 | 10/2008 | Do et al. | |
| 7,901,727 B2 | 3/2011 | Hofmann et al. | |
| 7,943,543 B1 | 5/2011 | Kulprathipanja et al. | |
| 8,003,707 B2 | 8/2011 | Holland | |
| 8,052,788 B2 | 11/2011 | MacDonald | |
| 8,163,388 B2 | 4/2012 | Do et al. | |
| 8,168,563 B2 | 5/2012 | Do et al. | |
| 8,211,193 B2 | 7/2012 | Mahulikar et al. | |
| 8,288,455 B1 | 10/2012 | Miller | |
| 8,309,113 B2 | 11/2012 | Hofmann et al. | |
| 8,431,034 B2 | 4/2013 | Petronis et al. | |
| 8,518,361 B2 | 8/2013 | Chang et al. | |
| 2002/0011443 A1 * | 1/2002 | Komatsu et al. | 210/650 |
| 2003/0107150 A1 | 6/2003 | Hamanaka et al. | |
| 2005/0121385 A1 | 6/2005 | Demmer et al. | |
| 2005/0234136 A1 | 10/2005 | Holland et al. | |
| 2006/0283095 A1 | 12/2006 | Mahulikar et al. | |
| 2007/0125701 A1 * | 6/2007 | Ramaswamy et al. | 210/490 |
| 2009/0011408 A1 | 1/2009 | Sorge et al. | |
| 2009/0149313 A1 | 6/2009 | Knight et al. | |
| 2009/0318282 A1 | 12/2009 | Buekenhoudt et al. | |
| 2010/0155325 A1 | 6/2010 | Zhang et al. | |
| 2010/0272996 A1 | 10/2010 | Holmes et al. | |
| 2010/0311871 A1 | 12/2010 | Suemura et al. | |
| 2011/0251057 A1 | 10/2011 | Keiser et al. | |
| 2012/0107601 A1 | 5/2012 | Weitz et al. | |
| 2012/0240763 A1 | 9/2012 | Liu et al. | |
| 2012/0276275 A1 | 11/2012 | Ergang et al. | |
| 2013/0112613 A1 | 5/2013 | Kang et al. | |
| 2013/0115295 A1 | 5/2013 | Wang et al. | |
| 2013/0134081 A1 | 5/2013 | Kang et al. | |
| 2013/0199995 A1 | 8/2013 | Jiang et al. | |
| 2013/0244338 A1 | 9/2013 | Baker et al. | |
| 2015/0246320 A1 | 9/2015 | David et al. | |
| 2015/0246321 A1 | 9/2015 | Wu et al. | |
| 2015/0246322 A1 | 9/2015 | LaRue et al. | |
| 2015/0246323 A1 | 9/2015 | Singh et al. | |
| 2015/0246324 A1 | 9/2015 | Singh et al. | |
| 2015/0246326 A1 | 9/2015 | David et al. | |
| 2015/0246328 A1 | 9/2015 | David et al. | |
| 2015/0246818 A1 | 9/2015 | Harton et al. | |

FOREIGN PATENT DOCUMENTS

| | | |
|---|---|---|
| CN | 1328868 A | 1/2002 |
| CN | 102382247 A | 3/2012 |
| CN | 103386299 A | 11/2013 |
| DE | 10058258 A1 | 8/2002 |
| DE | 10344819 A1 | 4/2005 |
| DE | 102006010831 A1 | 9/2007 |
| DE | 102006036863 A1 | 2/2008 |
| EP | 0 477 689 A1 | 4/1992 |
| EP | 1166859 A2 | 1/2002 |
| EP | 2476724 A1 | 7/2012 |
| JP | 54-020970 A | 2/1979 |
| JP | 2002-079066 A | 3/2002 |
| JP | 2003-093852 A | 4/2003 |
| JP | 2008-036635 A | 2/2008 |
| JP | 2013-052387 A | 3/2013 |
| JP | 2014-509333 A | 4/2014 |
| WO | WO 00/50161 A1 | 8/2000 |
| WO | WO 2005/063365 A1 | 7/2005 |
| WO | WO 2010/121064 A2 | 10/2010 |
| WO | WO 2012/097967 A1 | 7/2012 |
| WO | WO 2013/130893 A2 | 9/2013 |

OTHER PUBLICATIONS

Ding et al., "Experimental Investigation of Particle-Assisted Wetting," *Journal of American Chemical Society*, 128, 4930-4931 (2006).

Gates et al., "Fabrication and Characterization of Porous Membranes with Highly Ordered Three-Dimensional Periodic Structures," *Chemistry of Materials*, 11, 2827-2836 (1999).

Hoa et al., "Preparation of porous materials with ordered hole structure," *Advances in Colloid and Interface Science*, 121, 9-23 (2006).

Holland et al., "Synthesis of Highly Ordered, Three-Dimensional, Macroporous Structures of Amorphous or Crystalline Inorganic Oxides, Phosphates, and Hybrid Composites," *Chemistry of Materials*, 11, 795-805 (1999).

Jiang et al., "Large-Scale Fabrication of Wafer-Size Colloidal Crystals, Macroporous Polymers and Nanocomposites by Spin Coating," *Journal of American Chemical Society*, 126, 13778-13786 (2004).

Jiang et al., "Single-Crystal Colloidal Multilayers of Controlled Thickness," *Chemistry of Materials*, 11, 2132-2140 (1999).

Jiang et al., "Template-Directed Preparation of Macroporous Polymers with Oriented and Crystalline Arrays of Voids," *Journal of American Chemical Society* 121, 11630-11637 (1999).

Johansson, "Controlling the Pore Size and Morphology of Mesoporous Silica," Linköping Studies in Science and Technology, Licentiate Thesis No. 1451, Linköping University, Sweden, 79 pgs. (2010).

Johnson et al., "Ordered Mesoporous Polymers of Tunable Pore Size from Colloidal Silica Templates," *Science*, 283, 963-965 (1999).

Kellenberger et al., "Soluble nanoparticles as removable pore templates for the preparation of polymer ultrafiltration membranes," *Journal of Membrane Science*, 387-388, 76-82 (2012).r.

Li et al., "Preparation of mesoporous calcium doped silica spheres with narrow size dispersion and their drug loading and degradation behavior," *Microporous and Mesoporous Materials*, 102, 151-158 (2007).

Lim et al., "Precise Size-control of Silica Nanoparticles via Alkoxy Exchange Equilibrium of Tetraethyl Orthosilicate (TEOS) in the Mixed Alcohol Solution," *Bull. Korean Chem. Soc.*, vol. 33, No. 3, pp. 1067-1070 (2012).

Mitchell et al., "Iron(III)-Doped, Silica Nanoshells: A Biodegradable Form of Silica," *Journal of American Chemical Society*, 134, 13997-14003 (2012).

Park et al., "Fabrication of Three-Dimensional Macroporous Membranes with Assemblies of Microspheres as Templates," *Chemistry of Materials*, 10, 1745-1747 (1998).

(56) References Cited

OTHER PUBLICATIONS

Park et al., "Macroporous Membranes with Highly Ordered and Three-Dimensionally Interconnected Spherical Pores," *Advanced Materials*, 10, 1045-1048 (1998).
Stein et al., "Colloidal crystal templating of three-dimensionally ordered macroporous solids: materials for photonics and beyond," *Current Opinion in Solid State and Materials Science*, 5, 553-564 (2001).
Stein, A., "Sphere templating methods for periodic porous solids," *Microporous and Mesoporous Materials*, 44-45, 227-239 (2001).
Ulbricht, M., "Advanced functional polymer membranes," *Polymer*, 47, 2217-2262 (2006).
Velev et al., "Colloidal crystals as templates for porous materials," *Current Opinion in Colloid and Interface Science*, 5, 56-63 (2000).
Velev et al., "Structured Porous Materials viz Colloidal Crystal Templating: From Inorganic Oxides to Metals," *Advanced Materials*, 12, 531-534 (2000).
Wang et al., "Inverse colloidal crystal microfiltration membranes," *Journal of Membrane Science*, 365, 302-310 (2010).
Wong et al., "Colloidal Crystal Films: Advances in Universality and Perfection," *Journal of American Chemical Society*, 125, 15589-15598 (2003).
Xia et al., "Monodispersed Colloidal Spheres: Old Materials with New Applications," *Advanced Materials*, 12, 693-713 (2000).
Xu et al., "Polymer-Silica Hybrid Monolayers as Precursors for Ultrathin Free-Standing Porous Membranes," *Langmuir*, 18, 2363-2367 (2002).
Yan et al., "A Simple and Effective Method for the Preparation of Porous Membranes with Three-Dimensionally Arranged Pores," *Advanced Materials*, 16, 911-915 (2004).
Yan et al., "Hierarchically Struchtured Assembly of Polymer Microsieves, made by a Combination of Phase Separation Micromolding and Float-Casting," *Advanced Materials*, 24, 1551-1557 (2012).
Yan et al., "Polymer Membranes with Two-Dimensionally Arranged Pores Derived from Monolayers of Silica Particles," *Chemistry of Materials*, 16, 1622-1626 (2004).
Zakhidov et al., "Carbon Structures with Three-Dimensional Periodicity at Optical Wavelengths," *Science*, 282, 897-901 (1998).
Zhang et al., "Highly ordered periodic mesoporous ethanesilica synthesized under neutral conditions," *J. Mater. Chem.*, 15, pp. 2562-2568 (2005).
"Sol-Gel Processes," Production of Nonparticles lecture/seminar, Chapter 8 film presentation, Otto von Guericke Universitat Magdeburg, Germany. http://www.mvt.ovgu.de/mvt_media/Vorlesungen/VO_ENAP/Folien_ENAP_8.pdf downloaded Feb. 10, 2014.
European Patent Office, Extended European Search Report in European Patent Application No. 15152939.3 (mailed Jul. 27, 2015).
Ahmad et al., "Recent development in additives modifications of polyethersulfone membrane for flux enhancement," *Chemical Engineering Journal*, 223, May 2013, pp. 246-267.
Hou (Haoqing) et al. "Poly (p-xylylene) nanotubes by coating and removal of ultrathin polymer template fibers," *Macromolecules*, 35(7), 2002, pp. 2429-2431.
Liu et al., "A hard-template process to prepare three-dimensionally macroporous polymer electrolyte for lithium-ion batteries," *Electrochimica Acta*, 121, Jan. 2014, pp. 328-336.
Mueller et al., "Preparation and mechanical characterization of artificial hollow tubes," *Polymer*, 48, 2007, pp. 2520-2525.
Munakata et al., "Three-dimensionally ordered macroporous polyimide composite membrane with controlled pore size for direct methanol fuel cells," *Journal of Power Sources*, 178(2), Mar. 2008, pp. 596-602.
Stöber et al., "Controlled Growth of Monodisperse Silica Spheres in the Micron Size Range," *Journal of Colloid and Interface Science*, vol. 26, pp. 62-69 (1968).
Wachner et al., "Utilising Spontaneous Self-Organization of Particles to Prepare Asymmetric, Hierarchical Membranes Comprising Microsieve-Like Parts," *Advanced Materials*, 25, 278-283 (2013).
Weber et al., "Mesoporous Poly(benzimidazole) Networks via Solvent Mediated Templating of Hard Spheres," *Macromolecules*, 40, Feb. 2007, pp. 1299-1304.
Wilke et al., "Mesoporous Polymer Networks-Ultraporous DVB Resins by Hard-Templating of Close-Packed Silica Spheres," *Macromolecular Rapid Communications*, 33(9), May 2012, pp. 785-790.
Wu et al., "Design and Preparation of Porous Polymers," *Chemical Reviews*, 112(7), Jul. 2012, pp. 3959-4015.
Wu et al., "Molecule-Scale Controlled-Release System Based on Light-Responsive Silica Nanoparticles," *Chemical Communications*, 23, May 12, 2008, pp. 2662-2664, Supporting Information S1-S8, downloaded from Internet on Jan. 13, 2016 at http://www.rsc.org/suppdata/cc/b8/b804886j/b804886j.pdf.
Xu et al., "Multiple Fluorescent Labeling of Silica Nanoparticles with Lanthanide Chelates for Highly Sensitive Time-Resolved Immunofluorometric Assays," *Clinical Chemistry*, 53(8), Jun. 7, 2007, pp. 1503-1510, downloaded from Internet on Jan. 13, 2016 at http://www.clinchem.org/content/53/8/1503.full.pdf+html.
You et al., "Preparation of porous ultrafine PGA fibers via selective dissolution of electrospun PGA / PLA blend fibers," *Materials Letters*, 60(6), Mar. 2006, pp. 757-760.
Japanese Patent Office, Office Action mailed Jan. 5, 2016 in Japanese Patent Application No. 2015-015071.
Japanese Patent Office, Notice of Reasons for Rejection issued in Japanese Application No. 2015-015071 (Oct. 18, 2016).
State Intellectual Property Office of the People's Republic of China, Office Action issued in Chinese Application No. 201510184066.5 (Aug. 26, 2016).
State Intellectual Property Office of the People's Republic of China, Office Action issued in Chinese Application No. 201510184066.5 (Apr. 7, 2017) 13 pp.

\* cited by examiner

HOLLOW FIBER MEMBRANE HAVING HEXAGONAL VOIDS

BACKGROUND OF THE INVENTION

Hollow fiber membranes are used to filter a variety of fluids. However, there is a need for hollow fiber membranes that provide high throughput performance.

The present invention provides for ameliorating at least some of the disadvantages of the prior art. These and other advantages of the present invention will be apparent from the description as set forth below.

BRIEF SUMMARY OF THE INVENTION

An embodiment of the invention provides a hollow fiber membrane comprising (i) an inner surface; (ii) an outer surface; and (iii) a porous bulk disposed between the inner surface and the outer surface, wherein the porous bulk comprises at least a first region including: a) a first set of pores having a first controlled pore size and having outer rims; b) a second set of pores connecting the outer rims of the first set of pores, wherein the pore size of the first set of pores is greater than the pore size of the second set of pores; and c) a polymer matrix supporting the first set of pores.

In an embodiment, the invention provides a hollow fiber membrane comprising (i) an inner surface; (ii) an outer surface; and (iii) a porous bulk disposed between the inner surface and the outer surface, wherein the porous bulk comprises a first region and a second region, wherein the first region includes: a) a first set of pores having outer rims; b) a second set of pores connecting the outer rims of the first set of pores, wherein the pore size of the first set of pores is greater than the pore size of the second set of pores, and the second region includes a) a third set of pores having outer rims; b) a fourth set of pores connecting the outer rims of the third set of pores, wherein the pore size of the third set of pores is greater than the pore size of the fourth set of pores and c) a polymer matrix supporting the third set of pores.

In accordance with other embodiments of the invention, filters and filter devices comprising the membranes, as well of methods of making and using the membranes, are provided.

BRIEF DESCRIPTION OF THE SEVERAL VIEWS OF THE DRAWING(S)

FIG. 2 illustrates hexagonal packing of the first set of pores (formed by dissolving of particles) in a membrane according to an embodiment of the invention, wherein the hexagonal packing is 74 volume percent. FIG. 2 also illustrates the matrix ("polymer formed interstitials") supporting the first set of pores, and the second set of pores connecting the outer rims of the first set of pores.

DETAILED DESCRIPTION OF THE INVENTION

An embodiment of the invention provides a hollow fiber membrane comprising (i) an inner surface; (ii) an outer surface; and (iii) a porous bulk disposed between the inner surface and the outer surface, wherein the porous bulk comprises at least a first region including: a) a first set of pores having a first controlled pore size and having outer rims; b) a second set of pores connecting the outer rims of the first set of pores, wherein the pore size of the first set of pores is greater than the pore size of the second set of pores; and c) a polymer matrix supporting the first set of pores.

In accordance with an embodiment, the pore size of the first set of pores is in the range of from about 50 nm to about 1000 nm, for example, from about 160 nm to about 630 nm. Thus, for example, the pore size of the first set of pores is about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm, about 440 nm, about 460 nm, about 480 nm, about 500 nm, about 520 nm, about 540 nm, about 560 nm, about 580 nm, about 600 nm, or about 620 nm.

In an embodiment, the pore size of the second set of pores is in a ratio in the range of about 0.2 to about 0.4 times the pore size of the corresponding first set of pores.

In an embodiment, the invention provides a hollow fiber membrane comprising (i) an inner surface; (ii) an outer surface; and (iii) a porous bulk disposed between the inner surface and the outer surface, wherein the porous bulk comprises a first region and a second region, wherein the first region includes: a) a first set of pores having outer rims; b) a second set of pores connecting the outer rims of the first set of pores, wherein the pore size of the first set of pores is greater than the pore size of the second set of pores, and the second region includes a) a third set of pores having outer rims; b) a fourth set of pores connecting the outer rims of the third set of pores, wherein the pore size of the third set of pores is greater than the pore size of the fourth set of pores and c) a polymer matrix supporting the third set of pores.

In an embodiment, the pore size of the fourth set of pores is in a ratio in the range of about 0.2 to about 0.4 times the pore size of the third set of pores.

In an embodiment, the pore size of the third set of pores is at least 10%, for example, 20%, 30%, 40%, 50%, 60%, 70%, or 80%, different from the pore size of the first set of pores. The pore size of the third set of pores can be larger or smaller than the pore size of the first set of pores.

The present invention further provides a method of making a hollow fiber membrane, the method comprising: (a) forming at least one coating composition comprising a solvent, dissolvable nanoparticles, and a membrane-forming polymer; (b) coating the at least one coating composition onto a filament; (c) carrying out phase inversion of the coating composition or coating compositions coated onto the filament; (d) dissolving the dissolvable nanoparticles and removing the filament from the coated filament to obtain a hollow fiber membrane; and optionally (e) washing the hollow fiber membrane obtained in (d).

In an embodiment, the hollow fiber membrane is prepared by introducing dissolvable nanoparticles into one or more membrane forming polymers (typically, the membrane forming polymers are dissolved in a solvent), casting the nanoparticle-containing polymer solution (coating composition) (preferably, casting the nanoparticle-containing polymer solution on a substrate such as a filament or fiber wherein the substrate has been pretreated with a preconditioning or releasing agent; more preferably, wherein the agent has been dried on the substrate before casting the solution thereon), carrying out phase inversion of the nanoparticle-containing polymer solution to provide a membrane, subsequently dissolving the nanoparticles, and washing the resultant membrane. Preferably, the dissolvable nanoparticles comprise silica nanoparticles, especially ones having high surface area or low density.

Advantageously, hollow fiber membranes according to the invention can be produced using preformed polymers such as polyethersulfone (PES), polyvinylidene fluoride (PVDF), and polyacrylonitrile (PAN), that are commonly used in commercial membranes. Additionally, the nanoparticles can be dissolved without using hydrofluoric acid, for example, the nanoparticles can be dissolved using safer, more environmentally benign solvents such as an alkaline solution.

In other embodiments, filters and filter devices are provided, the filter and filter devices comprising at least one hollow fiber membrane.

A method of filtering fluid is also provided in accordance with another embodiment of the invention, the method comprising passing the fluid through at least one membrane, or a filter comprising at least one membrane, as described above.

In accordance with an embodiment of the invention, a method of preparing a membrane comprises (a) forming a composition comprising a silica nanoparticle-containing polymer solution; (b) coating the composition onto a filament substrate; (c) carrying out phase inversion of the coated nanoparticle-containing coating composition to provide a membrane; (d) dissolving the nanoparticles and obtaining a nanoparticle-depleted membrane; and (e) removing the filament substrate to obtain the hollow fiber membrane. Preferably (b) comprises casting the solution onto a filament substrate pretreated with a preconditioning agent or a release agent. In some embodiments of the method, the preconditioning agent or the release agent is dried on the substrate before casting the solution on the pretreated substrate. In some embodiments, (c) comprises immersing the coated filament in liquid to obtain the membrane. Alternatively, or in addition, the coated filament can be phase inverted by exposing it to a temperature in the range of from about 40° C. to about 80° C. for a period in the range of from about 1 minute to about 2 hours.

Figure 1:
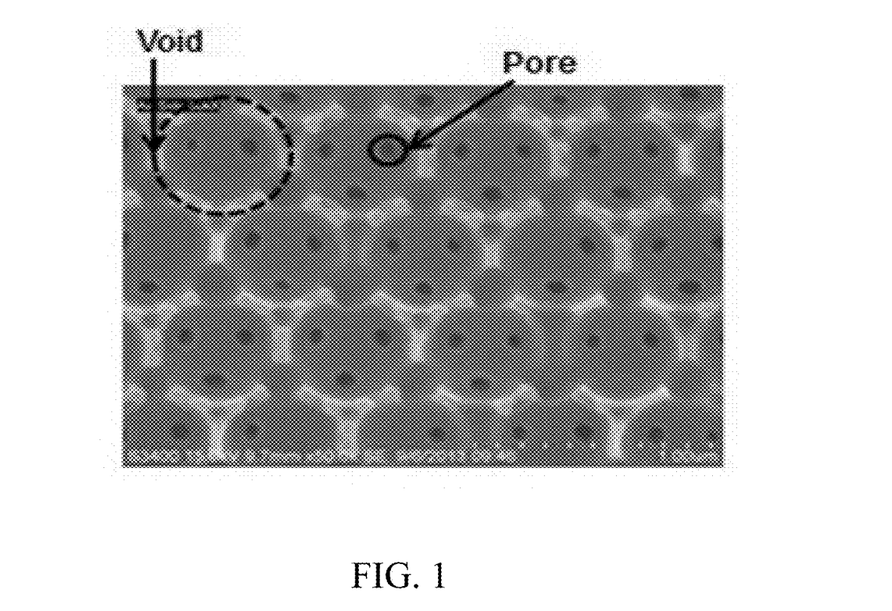
FIG. 1 is an illustration of the pores and voids present in at least some parts of the hollow fiber membrane according to the present invention, showing a first set of pores having connecting outer rims (one pore highlighted in dashed lines), and a second set of pores (one pore highlighted in solid line) located in the connecting outer rims of the first set of pores.

As will be described in more detail below, dissolving the particles creates a first set of pores in the membranes, the first set of pores having outer rims, and located within the outer rims is a second set of pores. As illustrated in FIG. 1, the dashed line highlights an outer rim of a pore in the first set, and the solid line highlights a pore in the second set. The second set of pores allows communication (e.g., fluid flow) from the void within one outer rim into the void of another outer rim.

A variety of dissolvable nanoparticles are suitable for use in preparing membranes according to embodiments of the invention. Preferably, the nanoparticles comprise silica, typically ranging in diameter from about 50 nm to about 1000 nm. In accordance with an embodiment, the silica nanoparticles have a diameter of about 50 nm to about 1000 nm and a particle density of about 1.96 $g/cm^3$ or less.

In an embodiment, the silica nanoparticles have a particle density of about 1.93 to about 1.96 $g/cm^3$.

The silica nanoparticles can have a particle size, e.g., diameter, of less than 1000 nm, in particular a particle size of from about 160 nm to about 630 nm. Thus, for example, the nanoparticles have a particle size of about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm, about 440 nm, about 460 nm, about 480 nm, about 500 nm, about 520 nm, about 540 nm, about 560 nm, about 580 nm, about 600 nm, or about 620 nm.

The silica nanoparticles can be prepared by a method comprising: (a) reacting an orthosilicate and an alcohol or a mixture of alcohols in an aqueous medium in the presence of a salt of a metal of Group Ia or Group IIa, or in the presence of a metalloid compound, optionally in combination with ammonium hydroxide, (b) isolating the resulting nanoparticles, and (c) treating the nanoparticles from (b) with an acid.

In an embodiment, the nanoparticles can be included in the coating composition prior to the acid treatment (c).

In an embodiment, the orthosilicate used in the preparation of the nanoparticles is a tetraalkylorthosilicate. Examples of tetraalkylorthosilicates tetramethylorthosilicate, tetraethylorthosilicate, tetrapropylorthosilicate, tetrabutylorthosilicate, and tetrapentylorthosilicate.

Any suitable alcohol or mixture of alcohols can be used in the preparation of the nanoparticles, for example, the alcohol or mixture of alcohols is selected from methanol, ethanol, propanol, butanol, and mixtures thereof.

The salt of the metal used in the preparation of the nanoparticles can be selected from salts of lithium, sodium, potassium, cesium, magnesium, and calcium. In an embodiment, the salt of the metal is selected from lithium acetate, sodium acetate, sodium metasilicate, sodium formate, potassium acetate, cesium acetate, magnesium acetate, and calcium acetate. In another embodiment, the metalloid compound is a compound of boron, for example, boric acid or a boric acid ester such as alkyl borate. The alkyl borate can be a trialkyl borate such as trimethyl borate or triethyl borate.

The acid employed in (c) of the method above can be a mineral acid or organic acid. Examples of mineral acids include hydrochloric acid, sulfuric acid, and nitric acid, preferably hydrochloric acid or sulfuric acid. Examples of organic acids include acetic acid, formic acid, trifluoroacetic acid, trichloroacetic acid, and p-toluenesulfonic acid, preferably formic acid. The nanoparticles isolated in (b) can be treated with a 1N to 2N acid, e.g., 1N HCl, for a period of about 0.5 hr to about 3 hr, preferably about 1 hr to 2 hr. For example, the nanoparticles can be sonicated in an acid bath for the above period. Following the acid treatment, the nanoparticles are isolated from the acid and washed with deionized water and dried under vacuum to obtain the silica nanoparticles.

Illustratively, silica nanoparticles were prepared as follows. In a 6 L jacketed flask kept at 25° C., 4.8 g lithium acetate dihydrate (LiOAc. $2H_2O$), 2480 mL deionized water (DI-$H_2O$), 2.9 L anhydrous ethanol (EtOH), and 120 mL 28% ww $NH_3$ in water were stirred for 30 min at 200 rpm using an overhead mixer with PTFE impellers. A solution of 300 mL EtOH with 200 mL tetraethylorthosilicate (TEOS), which was prepared under dry conditions (<10% relative humidity), was rapidly poured into the 6 L flask, and mixing was increased to 400 rpm and a dry air purge (<1% relative humidity) was utilized for 5 min. Mixing was reduced to 200 rpm, the dry air purge was removed, the flask was sealed, and the reaction continued for a total of 1 h. The particles were purified by centrifugation and re-suspension in EtOH three times. The particles prepared as above can be used as such in the preparation of the coating composition for preparing the hollow fiber membrane, or alternatively, they can be treated with HCl before preparing the coating composition.

Thus, the particles were sonicated with 1N HCl, washed with DI water, and dried under vacuum at 40° C.

Typical coating compositions (dispersions) comprising the dissolvable nanoparticles, preferably purified dissolvable nanoparticles, comprise the nanoparticles dispersed at concentrations in the range of from about 30 wt % to about 65 wt % dimethyl formamide (DMF), within the range of from about 0.001% to about 0.1% triethanolamine (TEA).

A membrane-forming polymer solution is prepared by dissolving the polymer in a solvent or a mixture of solvents. A variety of polymers is suitable for use as membrane-forming polymers in the invention, and is known in the art. Suitable polymers can include, polymers such as, for example, polyaromatics; sulfones (e.g., polysulfones, including aromatic polysulfones such as, for example, polyethersulfone (PES), polyether ether sulfone, bisphenol A polysulfone, polyarylsulfone, and polyphenylsulfone), polyamides, polyimides, polyvinylidene halides (including polyvinylidene fluoride (PVDF)), polyolefins, such as polypropylene and polymethylpentene, polyesters, polystyrenes, polycarbonates, polyacrylonitriles ((PANs) including polyalkylacrylonitriles), cellulosic polymers (such as cellulose acetates and cellulose nitrates), fluoropolymers, and polyetherether ketone (PEEK). Polymer solutions can include a mixture of polymers, e.g., a hydrophobic polymer (e.g., a sulfone polymer) and a hydrophilic polymer (e.g., polyvinylpyrrolidone (PVP)).

In addition to one or more polymers, typical polymer solutions comprise at least one solvent, and may further comprise at least one non-solvent. Suitable solvents include, for example, dimethyl formamide (DMF); N,N-dimethylacetamide (DMAC); N-methyl pyrrolidone (NMP); dimethyl sulfoxide (DMSO), methyl sulfoxide, tetramethylurea; dioxane; diethyl succinate; chloroform; and tetrachloroethane; and mixtures thereof. Suitable nonsolvents include, for example, water; various polyethylene glycols (PEGs; e.g., PEG-200, PEG-300, PEG-400, PEG-1000); various polypropylene glycols; various alcohols, e.g., methanol, ethanol, isopropyl alcohol (IPA), amyl alcohols, hexanols, heptanols, and octanols; alkanes, such as hexane, propane, nitropropane, heptanes, and octane; and ketone, ethers and esters such as acetone, butyl ether, ethyl acetate, and amyl acetate; acids, such as acetic acid, citric acid, and lactic acid; and various salts, such as calcium chloride, magnesium chloride, and lithium chloride; and mixtures thereof.

If desired, a solution comprising a polymer can further comprise, for example, one or more polymerization initiators (e.g., any one or more of peroxides, ammonium persulfate, aliphatic azo compounds (e.g., 2,2'-azobis(2-amidinopropane) dihydrochloride (V50)), and combinations thereof), and/or minor ingredients such as surfactants and/or release agents.

Typical stock solutions including a polymer (before combining with a solution comprising the dissolvable nanoparticles) comprise in the range of from about 10 wt % to about 35 wt % resin (e.g., PES, PVDF, or PAN), in the range of from about 0 to about 10 wt % PVP, in the range of from about 0 to about 10 wt % PEG, in the range of from about 0 to about 90 wt % NMP, in the range of from about 0 to about 90 wt % DMF, and in the range of from about 0 to about 90 wt % DMAC.

Suitable components of solutions are known in the art. Illustrative solutions comprising polymers, and illustrative solvents and nonsolvents include those disclosed in, for example, U.S. Pat. Nos. 4,340,579; 4,629,563; 4,900,449; 4,964,990, 5,444,097; 5,846,422; 5,906,742; 5,928,774; 6,045,899; 6,146,747; and 7,208,200.

While a variety of polymeric membranes can be produced in accordance with the invention, in preferred embodiments, the membranes are sulfone membranes (more preferably, polyethersulfone membranes and/or polyarylsulfone membranes), acrylic membranes (e.g., (PANs, including polyalkylacrylonitriles), or semi-crystalline membranes (for example, PVDF membranes and/or polyamide membranes).

The coating composition can be coated on a filament by any suitable technique, for example, by dip coating or spray coating.

A variety of filaments are suitable for coating the coating composition according to embodiments of the invention. Suitable filaments include, for example, glass, a polyester such as polyethylene terephthalate (PET); polypropylene; polyethylene (including polyethylene naphthalate (PEN); polyethylene terephthalate glycol (PETG)); polyimide; polyphenylene oxide; nylons, particularly polycaprolactam; and acrylics. Preferably, the filament is a monofilament. The filament can be of any suitable thickness depending on the desired inner diameter of the hollow fiber membrane. The filaments are typically circular in cross-section and about 0.1 mil to about 10 mils thick, for example, 1, 2, 3, 4, 5, 6, 7, 8, 9, or 10 mils thick.

In some embodiments, the filament has been preconditioned with a preconditioning agent, preferably, wherein the agent is dried before the particle-containing polymer solution (coating composition) is cast on the pretreated filament. Without being bound to any particular theory, it is believed that, with respect to some filaments, the use of a preconditioning agent improves efficiency in separating the hollow fiber membrane from the filament.

Preferably, the preconditioning agent does not dissolve in solvents used in the coating compositions, is compatible with membrane processing temperatures, sufficiently adheres to the coating during thermal processing that it does not delaminate, and dissolves readily in solvents that do not dissolve the membrane resin (such that the membrane can be released from the filament). Examples of suitable preconditioning agents include polyvinyl alcohol (PVOH), polyvinylpyrrolidone (PVP), poly(acrylic acid), and poly(methacrylic acid).

Illustratively, a PVOH stock solution can be prepared with about 5 wt % to about 15 wt % PVOH in deionized water, and cast on a filament by dipping the filament in the solution and withdrawing it to provide a coating having a thickness in the range of from about 1 to about 10 mil, and dried in an oven at a temperature in the range of from about 40° C. to about 80° C. for a period in the range of from about 1 minute to about 2 hours.

The preconditioned filament is coated with the coating composition to provide the desired coating thickness.

The coated filament is then subjected to a phase inversion process, which involves drying the coating containing resin(s), solvent system, and nanoparticles to remove some or all of the solvent. The coated filament can be dried, for example, by placing it in an oven at 40 to 80 C for a period of 1 min to about 2 hours. If desired, one or more additional coating compositions can be coated and dried in a similar manner on the filament that has been already coated and dried with the first coating composition. In an embodiment, the membrane-forming polymer in the first coating composition is different from the membrane-forming polymer in the second coating composition. In an embodiment, the solvent in the first coating composition is different from the solvent in the second coating composition.

In an embodiment, the particle size of the dissolvable nanoparticles in the first coating composition is different from the particle size of the dissolvable nanoparticles in the second coating composition. Thus, the dissolvable nanoparticles in the first coating composition can be larger or smaller than the particle size of the dissolvable nanoparticles in the second coating composition.

The filament that has been coated and dried as described above is then immersed in water for a suitable period of time, for example, 1 min to about 1 hr, thereby completing the solvent removal process.

The dissolvable particles are then removed by dissolving them in a suitable solvent. A variety of procedures are suitable for dissolving the particles. As noted above, the process should avoid using hydrofluoric acid; rather, the nanoparticles can be, and should be, dissolved using safer, more environmentally benign solvents. For example, the filament that has been coated and phase inverted can be placed in a mineral acid (e.g., HCl or $H_2SO_4$) at a concentration in the range of about 0.1 to about 2 moles/L for a period in the range of from about 1 minute to about 1 hour, followed by immersion in an alkaline solution (e.g., KOH or NaOH) at a concentration in the range of about 0.1 to about 4 moles/L for a period in the range of from about 30 minutes to about 24 hours, followed by washing in water (e.g., DI water) for a period in the range of about 30 minutes to about 4 hours. If desired, the resulting membrane can subsequently be dried, e.g., in an oven at a temperature in the range of from about 40° C. to about 80° C. for a period in the range of about 30 minutes to about 2 hours.

The filament is then removed from the above membrane by dissolving it in a suitable solvent. Any suitable solvent can be utilized which does not adversely affect the membrane. For example, formic acid can be used to dissolve a filament made of polycaprolactam. The resulting hollow fiber membrane is then washed with water for a suitable period of time, for example, 30 min to about 4 hr, and then dried, for example, in an oven at about 40° C. to about 80° C. for a period of about 30 min to about 2 hours.

Figure 2:
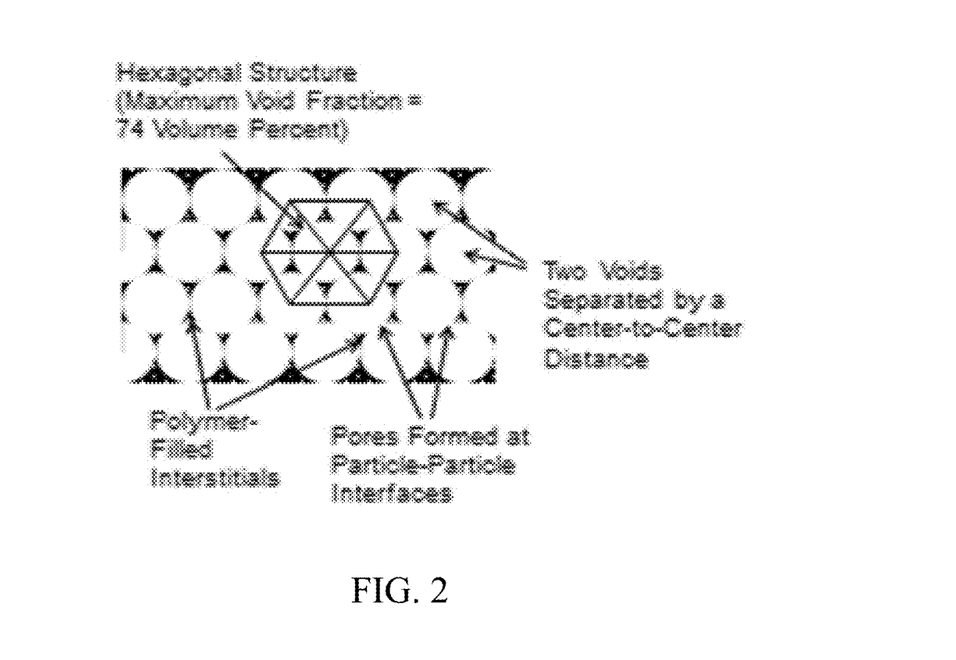

The hollow fiber membranes have a desirable hexagonal structure in at least small regions, resulting from the first set of pores in the bulk of the membrane. As illustrated in FIG. 2 (showing the first set of pores resulting from dissolving the introduced particles and the hexagonal structure representing the maximum void fraction), the maximum void fraction is 74 volume percent, and membranes according to embodiments of the invention have in the range of from about 66% to about 73% void fraction.

The surfaces of the hollow fiber membranes can have any suitable mean pore size, e.g., as determined by, for example, calculating the average surface pore size from an SEM at 5,000× or 20,000× magnification.

Typically, the wall thickness of the hollow fiber membranes according to embodiments of the invention is in the range of about 0.5 mils to about 6.5 mils, preferably, in the range of from about 1 mils to about 3 mils.

The membrane can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. Typically, the membrane has a CWST of greater than about 70 dynes/cm (about $70\times10^{-5}$N/cm), more typically greater than about 73 dynes/cm (about $73\times10^{-5}$N/cm), and can have a CWST of about 78 dynes/cm (about $78\times10^{-5}$N/cm) or more. In some embodiments, the membrane has a CWST of about 82 dynes/cm (about $82\times10^{-5}$N/cm) or more.

The surface characteristics of the hollow fiber membrane can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction. Modifications include, e.g., irradiation, a polar or charged monomer, coating and/or curing the surface with a charged polymer, and carrying out chemical modification to attach functional groups on the surface. Grafting reactions may be activated by exposure to an energy source such as gas plasma, vapor plasma, corona discharge, heat, a Van de Graff generator, ultraviolet light, electron beam, or to various other forms of radiation, or by surface etching or deposition using a plasma treatment.

A variety of fluids can be filtered in accordance with embodiments of the invention. Hollow fiber membranes according to embodiments of the invention can be used in a variety of applications, including, for example, diagnostic applications (including, for example, sample preparation and/or diagnostic lateral flow devices), ink jet applications, filtering fluids for the pharmaceutical industry, filtering fluids for medical applications (including for home and/or for patient use, e.g., intravenous applications, also including, for example, filtering biological fluids such as blood (e.g., to remove leukocytes)), filtering fluids for the electronics industry (e.g., filtering photoresist fluids in the microelectronics industry), filtering fluids for the food and beverage industry, clarification, filtering antibody- and/or protein-containing fluids, filtering nucleic acid-containing fluids, cell detection (including in situ), cell harvesting, and/or filtering cell culture fluids. Alternatively, or additionally, membranes according to embodiments of the invention can be used to filter air and/or gas and/or can be used for venting applications (e.g., allowing air and/or gas, but not liquid, to pass therethrough). Membranes according to embodiments of the inventions can be used in a variety of devices, including surgical devices and products, such as, for example, ophthalmic surgical products.

In accordance with embodiments of the invention, the hollow fiber membrane can be configured in a variety of configurations, e.g., the hollow fiber membrane can be arranged into bundles, sometimes with one end blinded.

Hollow fiber membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive hollow fiber membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

The following examples further illustrate the invention but, of course, should not be construed as in any way limiting its scope.

Example 1

This example demonstrates methods for making the conditioned substrate, resin stock solutions, and nanoparticle stock solutions.

PVOH stock solution (1): In a jacketed kettle kept at 90° C., a solution was prepared by combining 10% ww PVOH (96% Hydrolyzed, Scientific Polymer Products) with 90% deionized water and stirring at 200 rpm for 16 h. A polycaprolactam monofilament with a diameter of 1.5 mils was dipped into PVOH stock solution (1) and placed in an oven at 80° C. for 2 h.

Resin Stock Solution (1): In a jacketed kettle kept at 40° C. using a circulating bath, 30% (ww) PES resin (BASF, Ultrason E 6020 P), 15% N-methylpyrrolidone, and 55% dimethylformamide were mixed at 800 rpm using an overhead mixer for 4 h. The solution was placed under vacuum at 200 mbar for 30 minutes to deaerate the solution.

Particle Stock Solution (1): In a jacketed flask kept at 25° C., a solution was prepared consisting of 1 mol/L ammonia, 8.24 mol/L ethanol, 1 mol/L methanol, 23.7 mol/L water, 0.15 mol/L tetraethoxysilane, and 0.0078 mol/L sodium metasilicate and stirred at 200 rpm for 1 h. Dynamic light scattering and SEM showed particle diameters of approximately 570 nm. The particles were centrifuged, decanted, and re-suspended in ethanol twice. They were centrifuged, decanted, and re-suspended in dimethylformamide along with 0.1% triethanolamine three times. The stock solution had a final concentration of 63% (ww) particles.

Particle Stock Solution (2): In a jacketed flask kept at 25° C., a solution was prepared consisting of 0.9 mol/L ammonia, 9.16 mol/L ethanol, 23.07 mol/L water, 0.15 mol/L tetraethoxysilane, and 0.0078 mol/L lithium acetate and stirred at 200 rpm for 1 h. Dynamic light scattering and SEM show particle diameters of approximately 310 nm. The particles were centrifuged, decanted, and re-suspended in ethanol twice. They were centrifuged, decanted, and re-suspended in dimethylformamide along with 0.1% triethanolamine three times. The stock solution had a final concentration of 55% (ww) particles.

Example 2

This example illustrates the preparation of coating compositions used in the preparation of the hollow fiber membranes.

Coating composition (1): Resin stock solution (1) and particle stock solution (1) were combined in a flask along with PEG-1000 and PVP K90 and mixed at 30,000 rpm for 2 min with final concentrations of 40% (ww) particles, 11% PES, 0.5% PEG-1000, 0.5% PVP K90, 6% NMP, and 42% DMF. It was then deaerated at 200 mbar for 30 min.

Coating composition (2): Resin stock solution (1) and particle stock solution (2) were combined in a flask along with PEG-1000 and PVP K90 and mixed at 30,000 rpm for 2 min with final concentrations of 42% (ww) particles, 11% PES, 0.5% PEG-1000, 0.5% PVP K90, 5% NMP, and 41% DMF. It was then deaerated at 200 mbar for 30 min.

Example 3

This example illustrates a method of preparing a PES hollow fiber with one 570 nm particle-templated zone.

Figure 4A:
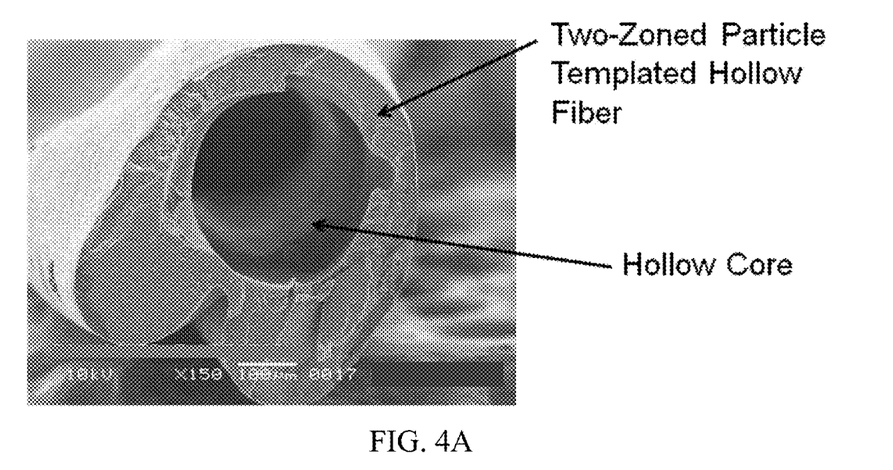
FIG. 4A depicts an SEM of a double zone PES hollow fiber membrane in accordance with an embodiment of the invention illustrated in Example 4.
Figure 4B:
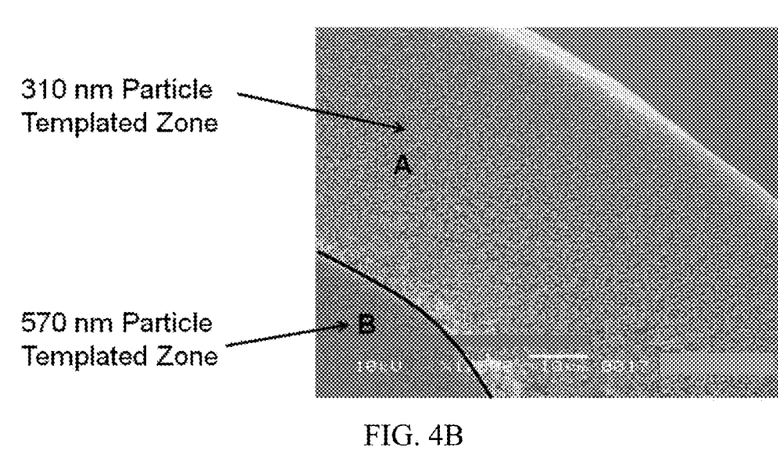
FIG. 4B is a higher magnification SEM of the hollow fiber membrane showing the two porous zones.
Figure 5A:
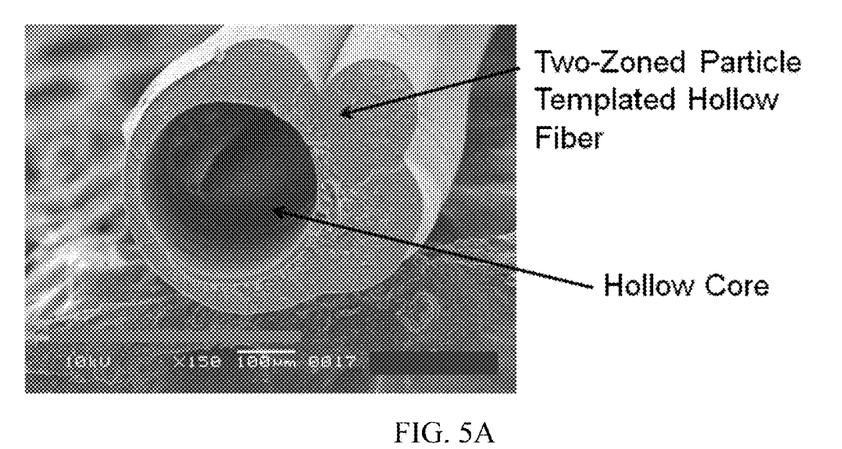
FIG. 5A depicts an SEM of a double zone PES hollow fiber membrane in accordance with an embodiment of the invention illustrated in Example 5.
Figure 5B:
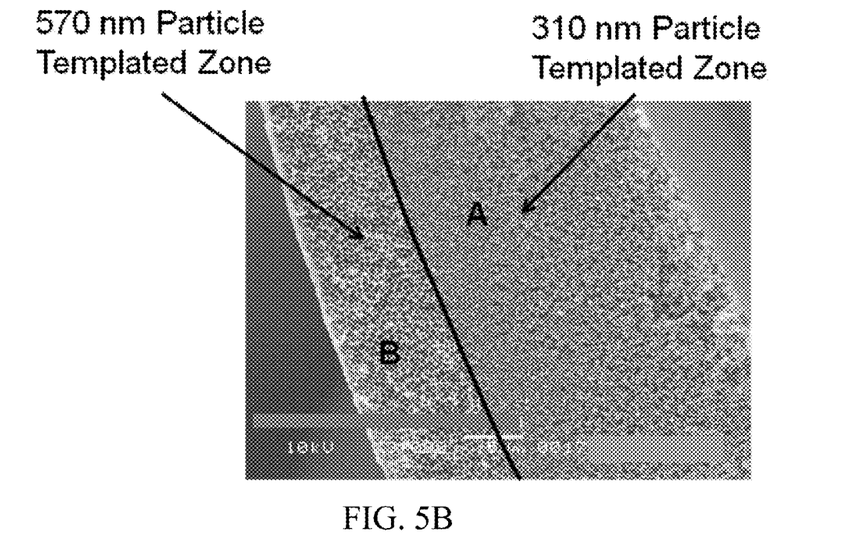
FIG. 5B is a higher magnification SEM of the hollow fiber membrane showing the two porous zones.
Figure 5C:
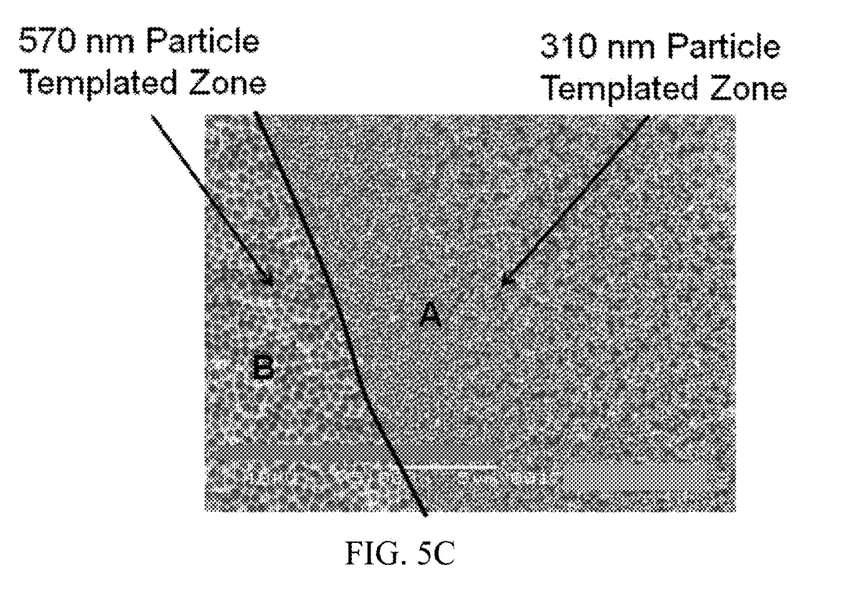
FIG. 5C is an even higher magnification SEM of the hollow fiber membrane.

The monofilament was dipped into coating composition (1) and placed in an oven for 15 min at 60° C., followed by immersion immersed in water at 80° C. for 1 h. The coated filament was soaked in 1 mol/L HCl for 30 min, then 2 mol/L KOH for 18 h and the filament removed by soaking in formic acid for 18 h. The hollow fiber membrane was then washed with water at 25° C. for 2 h and dried at 70° C. for 30 min. An SEM image of the cross-section is shown in FIG. 4. The first set of pores is about 570 nm, and the second set of pores is about 171 nm in diameter.

Example 4

This example illustrates a method of preparing a PES hollow fiber with two particle-templated zones: 310 nm: 570 nm The monofilament was dipped into coating composition (1) and placed in an oven for 15 min at 60° C., followed by dipping in coating composition (2) and placing in an oven for 15 min at 60° C. The coated filament was then immersed in water at 80° C. for 1 h and soaked in 1 mol/L HCl for 30 min, then 2 mol/L KOH for 18 h. The filament was removed by soaking in formic acid for 18 h. The hollow fiber was then washed with water at 25° C. for 2 h and dried at 70° C. for 30 min. SEM images of the cross-sections are shown in FIG. 2. The first set of pores in the inner region is about 310 nm, and the second set of pores is about 93 nm in diameter. The first set of pores in the outer region is about 570 nm, and the second set of pores is about 171 nm in diameter.

Example 5

Figure 3A:
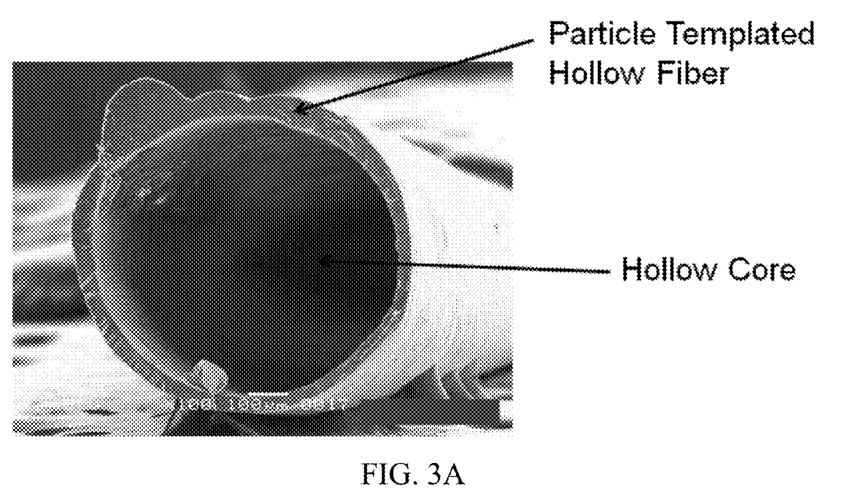
FIG. 3A depicts an SEM of a single zone PES hollow fiber membrane in accordance with an embodiment of the invention illustrated in Example 3.
Figure 3B:
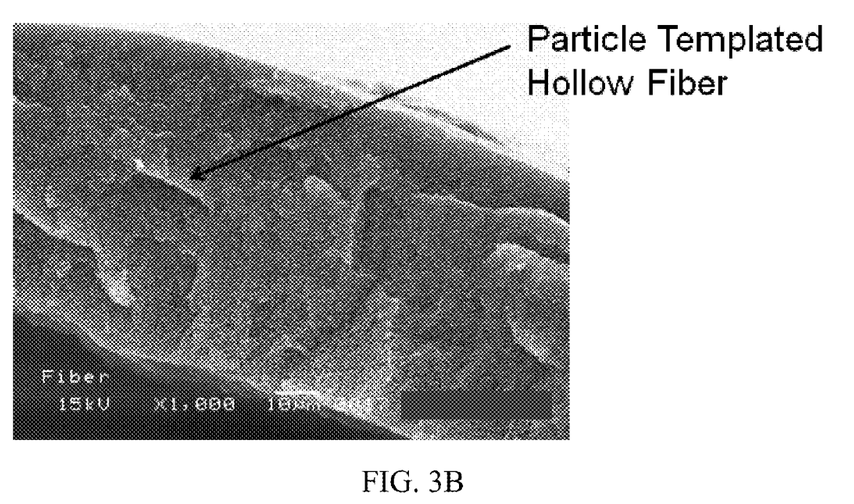
FIG. 3B is a higher magnification SEM of the hollow fiber membrane depicted in FIG. 3A.
Figure 3C:
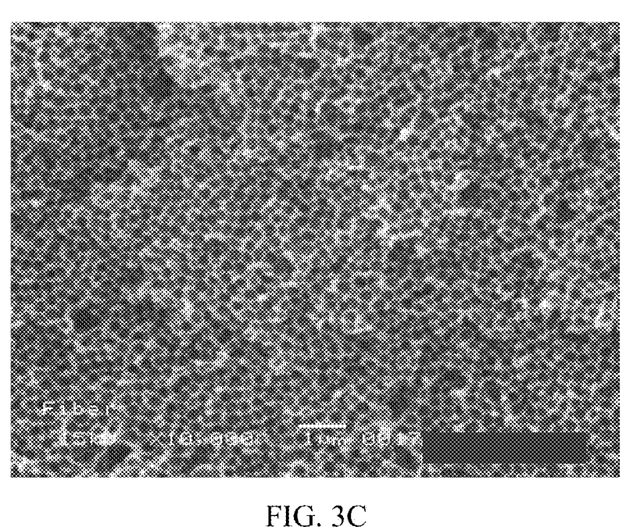
FIG. 3C is an even higher magnification SEM of the hollow fiber membrane.

This example illustrates a method of preparing a PES hollow fiber with two particle-templated zones: 570 nm: 310 nm The monofilament was dipped into coating composition (2) and placed in an oven for 15 min at 60° C., followed by dipping in coating composition (1) and placing in an oven for 15 min at 60° C. The coated filament was then immersed in water at 80° C. for 1 h and soaked in 1 mol/L HCl for 30 min, then 2 mol/L KOH for 18 h. The core filament was removed by soaking in formic acid for 18 h. The hollow fiber was then washed with water at 25° C. for 2 h and dried at 70° C. for 30 min. SEM images of the cross-sections are shown in FIG. 3. The first set of pores in the inner region is about 570 nm, and the second set of pores is about 171 nm in diameter. The first set of pores in the outer region is about 310 nm, and the second set of pores is about 93 nm in diameter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A hollow fiber membrane comprising:
   (i) an inner surface;
   (ii) an outer surface; and
   (iii) a porous bulk disposed between the inner surface and the outer surface,
   wherein the porous bulk comprises at least a first region including: a) a first set of pores having a first controlled pore size and having outer rims; b) a second set of pores connecting the outer rims of the first set of pores, wherein the pore size of the first set of pores is about 570 nm and the pore size of the second set of pores is about 310 nm; and c) a first polymer matrix supporting the first set of pores and the second set of pores, wherein the porous bulk further comprises at least a second region including: d) a third set of pores having outer rims; e) a fourth set of pores connecting the outer rims of the third set of pores, wherein the pore size of the third set of pores is about 171 nm and the pore size of the fourth set of pores is about 93 nm; and (f) a second polymer matrix supporting the third set of pores and the fourth set of pores; or
   wherein the porous bulk comprises at least a first region including: a) a first set of pores having a first controlled pore size and having outer rims; b) a second set of pores connecting the outer rims of the first set of pores, wherein the pore size of the first set of pores is about 310 nm and the pore size of the second set of pores is about 570 nm; and c) a first polymer matrix supporting the first set of pores and the second set of pores, wherein the porous bulk further comprises at least a second region including: d) a third set of pores having outer rims; e) a fourth set of pores connecting the outer rims of the third set of pores, wherein the pore size of the third set of pores is about 93 nm and the pore size of the fourth set of pores is about 171 nm; and (f) a second polymer matrix supporting the third set of pores and the fourth set of pores;
   wherein each of the first and second polymer matrices comprises a polymer selected from polyethersulfone (PES), polyether ether sulfone, bisphenol A polysulfone, polyphenylsulfone, a polyvinylidene halide, a polyolefin, polystyrene, polycarbonate, polyacrylonitrile, a cellulosic polymer, a fluoropolymer, and polyetherether ketone (PEEK);
   wherein the first set of pores has a hexagonal structure and hollow fiber membrane has a void volume fraction of about 66% to 74%.

2. A method of filtering a fluid, the method comprising passing the fluid through the hollow fiber membrane of claim 1.

3. The hollow fiber membrane of claim 1, wherein each of the first and second polymer matrices comprises polyethersulfone, polyacrylonitrile, or a fluoropolymer.

4. The hollow fiber membrane of claim 3, wherein each of the first and second polymer matrices comprises polyethersulfone.

5. The hollow fiber membrane of claim 1, wherein the porous bulk comprises at least a first region including: a) a first set of pores having a first controlled pore size and having outer rims; b) a second set of pores connecting the outer rims of the first set of pores, wherein the pore size of the first set of pores is 570 nm and the pore size of the second set of pores is 310 nm; and c) a first polymer matrix supporting the first set of pores and the second set of pores, wherein the porous bulk further comprises at least a second region including: d) a third set of pores having outer rims; e) a fourth set of pores connecting the outer rims of the third set of pores, wherein the pore size of the third set of pores is about 171 nm and the pore size of the fourth set of pores is about 93 nm; and (f) a second polymer matrix supporting the third set of pores and the fourth set of pores.

6. The hollow fiber membrane of claim 1, wherein the porous bulk comprises at least a first region including: a) a first set of pores having a first controlled pore size and having outer rims; b) a second set of pores connecting the outer rims of the first set of pores, wherein the pore size of the first set of pores is 310 nm and the pore size of the second set of pores is 570 nm; and c) a first polymer matrix supporting the first set of pores and the second set of pores, wherein the porous bulk further comprises at least a second region including: d) a third set of pores having outer rims; e) a fourth set of pores connecting the outer rims of the third set of pores, wherein the pore size of the third set of pores is 93 nm and the pore size of the fourth set of pores is 171 nm; and (f) a second polymer matrix supporting the third set of pores and the fourth set of pores.

\* \* \* \* \*